No. 893,798. PATENTED JULY 21, 1908.
C. A. HART.
MOTOR PLOW.
APPLICATION FILED APR. 20, 1908.
2 SHEETS—SHEET
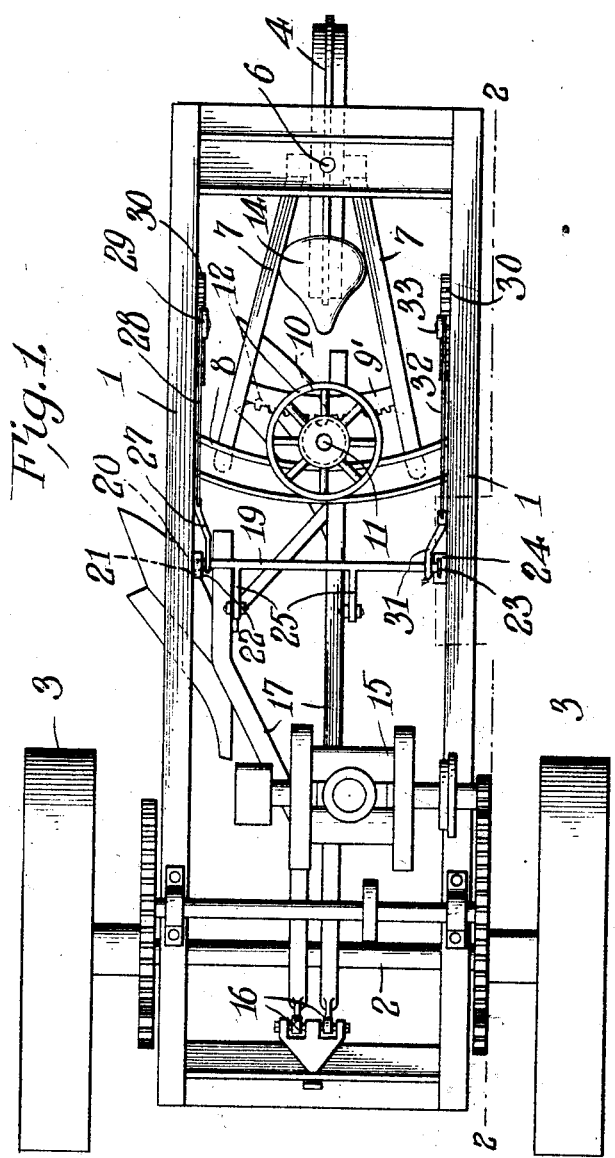
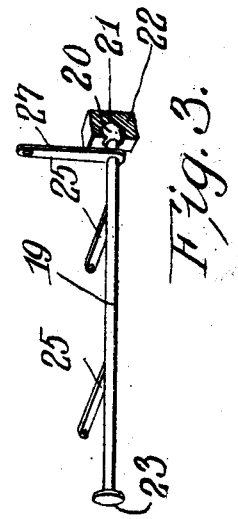
Witnesses
C. E. Smith,
S. E. Dodge.
Inventor
C. A. Hart,
By Peeler & Cobb
Attorneys

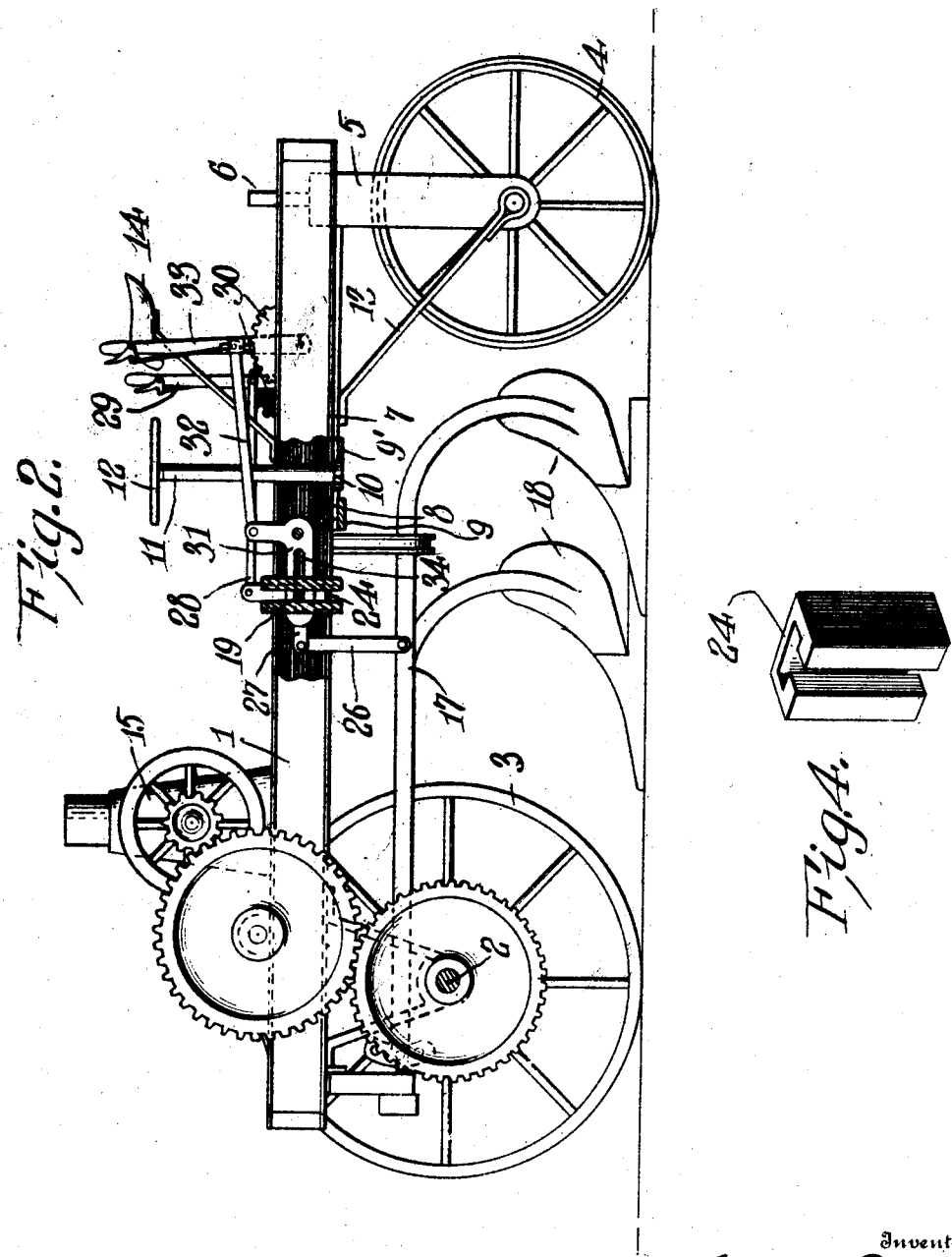

UNITED STATES PATENT OFFICE.

CORDA A. HART, OF DANVILLE, ILLINOIS.

MOTOR-PLOW.

No. 893,798.   Specification of Letters Patent.   Patented July 21, 1908.

Application filed April 20, 1908. Serial No. 428,252.

*To all whom it may concern:*

Be it known that I, CORDA A. HART, a citizen of the United States, residing at Danville, in the county of Vermilion and State of Illinois, have invented certain new and useful Improvements in Motor-Plows, of which the following is a specification.

This invention embodies improvements in that type of agricultural implements propelled by a motor mounted upon the implement, and designed particularly for plowing.

In the practical embodiment of the invention it is contemplated that the plow shall be driven by an engine of the explosive type, and included among the essential features of the invention is peculiar mechanism whereby the plow or plows mounted on the frame of the implement may be adjusted to throw the same into and out of operation or to accommodate for inequalities in the ground over which the implement passes.

The invention further involves novel details of construction as will appear more fully hereinafter.

For a full understanding of the invention, reference is to be had to the following detail description and to the accompanying drawings, in which Figure 1 is a top plan view of an implement embodying the invention; Fig. 2 is a side elevation; Fig. 3 is a detail perspective view of the plow adjusting shaft; Fig. 4 is a detail perspective view of the socket receiving an end of the transverse shaft.

Throughout the following detail description and on the several figures of the drawings, similar parts are referred to by like reference characters.

Referring to the drawings and describing specifically the construction of the invention, the numeral 1 designates the frame of the implement, which is preferably of rectangular form, being supported at its front portion by an axle 2 mounted on ground wheels 3. At its rear end the frame 1 is carried by a steering wheel 4 supported in a bifurcated standard 5. The standard 5 is provided at its upper end with a reduced journal 6 mounted in a suitable bearing provided in the frame, whereby the wheel 4 is adapted for turning movement in order to vary the direction of travel of the implement.

The operating means for the steering wheel 4 comprises a frame 7 consisting of sides arranged in divergent relation and connected at the remote ends thereof by an arc-shaped plate 8 which is adapted to coöperate with suitable guiding means 9 attached to the frame 1. Some distance from the plate 8 the opposite sides of the frame 7 are connected by a toothed bar 9' between which and the plate 8 is arranged a horizontal gear 10 the teeth of which mesh with the teeth of the bar 9'. The gear 10 is attached to the lower end of a steering shaft 11 mounted in any substantial manner upon the frame 1 of the implement and having at its upper end a suitable hand wheel 12. The rear end of the frame 7 is formed with an opening adapted to receive the journal 6, and suitable fastenings are provided to attach this portion of the frame 7 to the upper end of the standard 5. Upwardly inclined braces 13 may be used to connect the lower end of the standard 5 with the front portion of the frame 7. It will be apparent that by rotation of the hand wheel 12 the direction of movement of the implement may be varied at the will of the operator who is seated upon the seat 14, when the implement is being used.

The motor by which the implement is propelled is preferably mounted upon the forward portion of the frame 1 and consists of an explosive engine 15. The engine 15 may be of any suitable horse power according to the size of the implement with reference particularly to the number of plow shovels carried thereby. The front axle 2 is connected by a suitable train of gearing with the power shaft of the motor 15, and the operation of the implement will be controlled by any suitable mechanism operable from the seat 14 so as to permit of starting or stopping the plow at any time. Pivotally and adjustably connected with the front end of the frame 1, as shown at 16, are a plurality of beams 17, the rear ends of which support the turning plows 18. Any suitable number of the beams 17 may be provided within the contemplation of the invention.

Arranged transversely of the frame 1 about at the middle portion thereof is a crank shaft 19 which is peculiarly mounted to admit of special adjustment of the turning plows 18. Said shaft 19 is formed at one end with a ball 20 received by a socket 21 in a socket plate 22 secured to one side of the frame 1. The opposite end of the shaft 19 is formed with a head 23 which is movable vertically in a guide 24 secured to the opposite side of the frame 1. In other words the shaft 19 has a ball and socket connection at one end with a side of the frame 1 while its other end is slidably mounted upon the opposite side of the frame. Arms 25 project laterally from the shaft 19 and said arms are connected by links 26 with the beams 17.

Extending upwardly from the end of the shaft adjacent to the ball and socket connection 20 and 21 is a crank arm 27 connected by a rod 28 with a lever 29 mounted upon the adjacent side of the frame 1 and adapted to be held at the desired adjustment by means of a common hand operable catch which coöperates with a segment 30 applied to the frame 1. It will be apparent that by operation of the lever 29 the shaft 19 may be rotated so as to either raise or lower the beams 17 and the turning plows carried thereby, by reason of the connections between the arms 25 and said beams.

Another adjusting mechanism for the shaft 19 is provided and is mounted upon the frame 1 at the side opposite that carrying the adjusting device above described. This adjusting mechanism comprises a bell crank lever 31 pivoted to the frame 1 at the side adjacent to the guide plate 24. The vertical arm of the lever 31 is connected by a rod 32 with an operating lever 33 being also adapted to be held at a desired adjustment by a segment 30 coöperating with a catch on the lever. The horizontal arm of the bell crank lever 31 is formed with an elongated opening or slot 34 sufficiently large to receive the end portion of the shaft 19 adjacent to the head 23 thereof. It will be obvious that by operation of the lever 33 the bell crank lever 31 may be tilted so as to raise or lower the end of the shaft 19 which operates in the slot 34 and is movable longitudinally of said slot in an evident manner. Adjustment of the bell crank lever 31 therefore admits of adjusting the end of the shaft 19 connected therewith without raising or lowering the opposite end of the shaft, and by this means said shaft may be inclined with reference to a horizontal plane.

It will be apparent in view of the foregoing that the shaft 19 is so mounted and connected with the beams 17 as to permit of simultaneously lowering or raising the beams, to elevate or lower one of the beams with respect to the other, or to accomplish other combined adjustments such as may be desirable and necessary in the actual operation of the implement, either to throw the turning plows 18 into and out of operation, or to adjust the relative positions of said turning plows to accommodate for inequalities in the ground over which the implement is advanced.

The various advantages of the construction embodied in my invention will be evident in view of the detail description hereinconstruction and arrangement of the various parts may be modified in accordance with the broad spirit of the invention.

Having thus described the invention, what is claimed as new, is:

1. In a power driven implement of the class described, the combination of a supporting frame, a plurality of plow beams mounted thereon, turning plows carried by said beams, a shaft having a ball and socket connection at one end with one side of the frame and slidably connected at its opposite end with the other side of the frame, connecting means between said shaft and the beams, means for actuating the shaft to simultaneously adjust the position of the beams, and means for adjusting the shaft to vary the relative position of said beams.

2. In a power driven implement of the class described, the combination of a supporting frame, propelling means therefor, a plurality of plow beams movably mounted on said frame, turning plows carried by said beams, a transverse shaft mounted on the frame, crank arms projecting from said shaft, connections between said arms and the beams, means for rotating the shaft to simultaneously adjust the positions of the beams, and mechanism for adjusting said shaft at an angle to the horizontal whereby to vary the position of one beam relative to the other.

3. In a power driven implement of the class described, the combination of a supporting frame, propelling means therefor, a plurality of plow beams movably mounted on said frame, turning plows carried by said beams, a transverse shaft having a ball and socket connection at one end with one side of the frame, a guide at the opposite side of the frame in which the other end of the shaft is slidably mounted, connections between the shaft and the beams, means for turning the shaft to simultaneously raise or lower the beams, a bell crank lever mounted on the frame and slidably connected with the shaft at one end thereof, and means for adjusting the position of said bell crank lever to raise or lower one end of the shaft and thereby vary the position of the beams.

4. In an agricultural implement of the class described, the combination of a frame, supporting wheels therefor, a plurality of plow beams mounted on the frame, turning plows carried by said beams, a transverse shaft having a ball and socket connection at one end with one side of the frame, a vertical guide at the opposite side of the frame in which the other end of the shaft is slidably mounted, arms projecting from the shaft, connections between said arms and the beams, a crank arm projecting from the shaft, a lever mounted on the frame, a connection between said crank arm and the lever for rotating the shaft to simultaneously raise or lower the beams, a bell crank lever mounted on the frame on the side opposite that having a ball and socket joint, said lever embodying an arm provided with a slot receiving the adjacent end of the shaft, and mechanism for adjusting the bell crank lever to raise and lower the end of the shaft and effect an angular adjustment of the latter.

In testimony whereof I affix my signature in presence of two witnesses.

CORDA A. HART.

Witnesses:
S. N. SIMS,
C. H. HEDGES